United States Patent
Charpentier et al.

(10) Patent No.: US 8,167,366 B2
(45) Date of Patent: May 1, 2012

(54) AUTOMOBILE SEAT INCLUDING A FOLDABLE BACK COMPRISING A MEMBER DEFINING A TABLET, AND AUTOMOBILE WITH SUCH SEAT

(75) Inventors: Bruno Charpentier, Dreux (FR);
Jean-Christophe Riou, Villiers-Saint-Frederic (FR)

(73) Assignee: Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 12/522,927

(22) PCT Filed: Jan. 14, 2008

(86) PCT No.: PCT/FR2008/000038
§ 371 (c)(1),
(2), (4) Date: Jul. 13, 2009

(87) PCT Pub. No.: WO2008/107531
PCT Pub. Date: Sep. 12, 2008

(65) Prior Publication Data
US 2010/0109389 A1    May 6, 2010

(30) Foreign Application Priority Data
Jan. 19, 2007    (FR) ..................................... 07 00370

(51) Int. Cl.
*A47B 85/04*    (2006.01)
*A47B 83/02*    (2006.01)
(52) U.S. Cl. .......................... 297/125; 297/167; 297/173

(58) Field of Classification Search ................ 297/163, 297/167, 169, 173, 124, 125
See application file for complete search history.

(56) References Cited

U.S. PATENT DOCUMENTS

| | | | | |
|---|---|---|---|---|
| 2,866,496 | A | * | 12/1958 | Glass .............................. 297/113 |
| 3,666,319 | A | * | 5/1972 | Moloney, Jr. .................. 297/113 |
| 6,032,587 | A | * | 3/2000 | Salenbauch et al. ............ 108/44 |
| 6,059,358 | A | * | 5/2000 | Demick et al. ........... 297/188.04 |
| 6,135,549 | A | * | 10/2000 | Demick et al. ............. 297/188.1 |
| 6,199,948 | B1 | * | 3/2001 | Bush et al. ................... 297/217.3 |
| 6,220,660 | B1 | * | 4/2001 | Bedro et al. ............. 297/188.04 |
| 6,273,310 | B1 | * | 8/2001 | Gregory ......................... 224/275 |
| 6,547,323 | B1 | * | 4/2003 | Aitken et al. ................. 297/113 |
| 6,702,375 | B1 | | 3/2004 | Laskowski et al. |
| 7,520,552 | B2 | * | 4/2009 | Nakamura et al. ......... 296/24.34 |
| 7,607,726 | B2 | * | 10/2009 | Orlo et al. ...................... 297/125 |

FOREIGN PATENT DOCUMENTS

| | | |
|---|---|---|
| DE | 43 43 242 A1 | 6/1995 |
| DE | 198 54 985 A1 | 5/2000 |
| WO | WO 99/35003 | 7/1999 |

* cited by examiner

*Primary Examiner* — Sarah B McPartlin
(74) *Attorney, Agent, or Firm* — Oblon, Spivak, McClelland, Maier & Neustadt, L.L.P.

(57) ABSTRACT

An automobile seat including a seating portion, a back that can be folded onto the seating portion and including a rear face at least partially covered by a member defining a tablet and that can be brought into a substantially horizontal position. The member defining the tablet includes a rotary tray mounted on the rear face of the back so as to pivot about a first axis substantially perpendicular to the rear face to be moved into a position in which a portion of the rotary tray laterally protrudes from the rear face of the back.

15 Claims, 2 Drawing Sheets

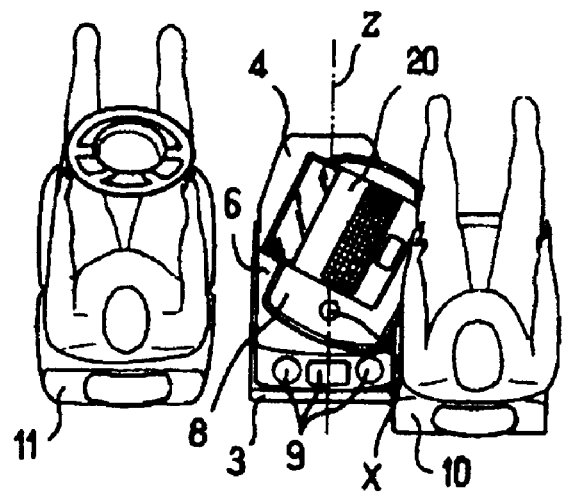
FIG_3
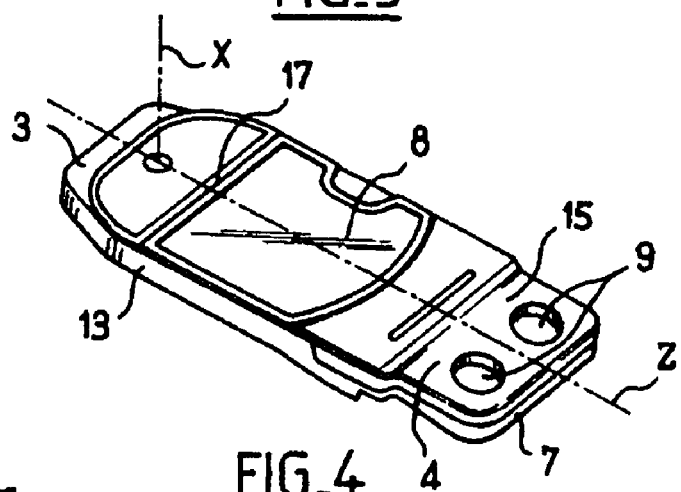
FIG_4
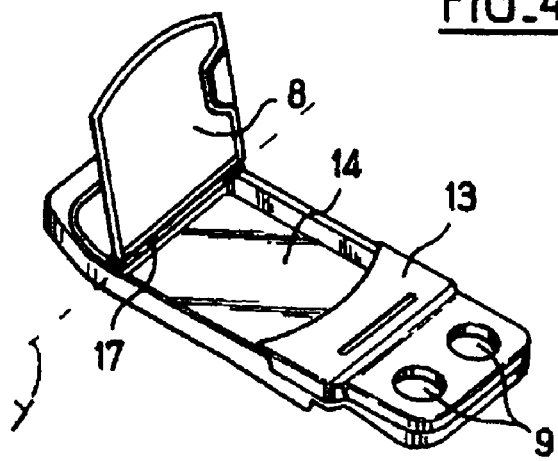
FIG_5
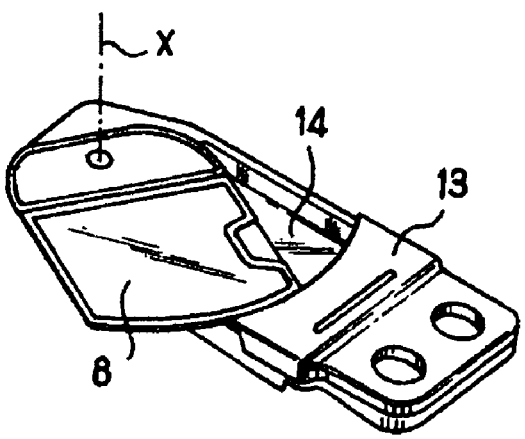
FIG_6

AUTOMOBILE SEAT INCLUDING A FOLDABLE BACK COMPRISING A MEMBER DEFINING A TABLET, AND AUTOMOBILE WITH SUCH SEAT

BACKGROUND OF THE INVENTION

I. Field of the Invention

The present invention relates to a motor vehicle seat of which the backrest can fold onto the seat cushion in such a way as to form a tablet.

II. Description of Related Art

Document DE 4 343 242 describes a tablet, fixed to a retractable support, positioned beside a motor vehicle seat. When the support is lowered, the tablet, which is articulated such that it rotates to one side of the support, about an axis perpendicular to the latter, can be unfolded and brought in front of the seat to allow it to be used by a user sitting in the seat. The support may comprise two tablets, each articulated on one side of the support, so that they can be used by users sitting in seats positioned side by side. This type of device is very bulky because it is necessary to provide enough space to fix the tablet support between the two seats.

Furthermore, it is known practice to use the rear face of the folding backrests of certain motor vehicle seats as tablets. This type of seat comprises a seat cushion, fixed to the floor of the vehicle, and a backrest which can be folded onto the seat cushion and the rear face of which comprises a tablet-forming element, which, when the backrest is folded onto the seat cushion, forms a flat surface substantially parallel to the floor of the vehicle and which can act as a tablet. This type of tablet is, however, not very ergonomic because the working area offered remains small and distant from a user sitting on a seat positioned beside the folded seat.

BRIEF SUMMARY OF THE INVENTION

It is an object of the present invention to propose a motor vehicle seat of the type comprising a seat cushion and a backrest that can be folded onto the seat cushion, the rear face of which comprises a tablet-forming element that can be readily used by a user sitting beside this seat, when the backrest is folded onto the seat cushion.

This object is achieved by means of a motor vehicle seat comprising a seat cushion, a backrest that can be folded onto the seat cushion, which comprises a rear face at least partially covered with a tablet-forming element and which can be brought into a substantially horizontal position when the backrest is folded onto the seat cushion. According to the invention, the tablet-forming element comprises a turntable pivot-mounted on the rear face of the backrest about a first axis, substantially perpendicular to the rear face, so that it can be brought into a position in which a portion of the turntable protrudes laterally from the rear face of the backrest. This laterally protruding tablet portion itself constitutes an increase in the surface area of the rear face of the seat that can be used as a tablet. Moreover, its lateral position makes it very readily accessible to a user sitting beside the seat according to the present invention.

According to a first embodiment, the backrest has a longitudinal axis and a headrest-forming portion, and the first axis of rotation of the turntable is positioned in the region of the headrest-forming portion. The turntable is thus pivot-mounted in the region of the front part of the seat cushion when the backrest is folded onto the seat cushion.

According to a second embodiment, the backrest has a first edge connected to the seat cushion and a longitudinal axis, and the first axis of rotation of the turntable intersects the longitudinal axis near the first edge of the backrest. When the backrest is folded onto the seat cushion, the turntable is pivot-mounted in the region of the rear of the seat cushion as this advantageously allows the table to be brought closer to the user with ease.

The tablet-forming element may comprise a storage housing accessible from the rear face of the backrest and located at least partially under the turntable. This housing may be used for storage, for example, for a laptop computer that will later be used on the turntable when the backrest is folded onto the seat cushion.

This housing may be positioned in such a way as to be accessible by rotating the turntable about the first axis of rotation.

A part of the turntable may also be pivot-mounted about a second axis of rotation, substantially parallel to the rear face, so that it can be raised, above the tablet-forming element so as to open access to said storage housing.

According to one particular embodiment, the backrest comprises a frame, the tablet-forming element comprises a rigid carcass which is fixed to the frame of said backrest and which supports the turntable.

The present invention also relates to a motor vehicle comprising a row of at least two seats. According to the invention, at least one of the seats is a seat according to the invention.

The row of seats may comprise at least three seats and the seat according to the invention may then be positioned between two seats.

According to the invention, the row of seats is a row of front seats or a row of rear seats. Thus, the seat according to the invention can be used in the front of a vehicle comprising a row of one or two seats situated beside the driver's seat.

BRIEF DESCRIPTION OF THE DRAWINGS

The present invention, its features and the various advantages it affords will be better understood from reading the description which follows of two exemplary embodiments given by way of nonlimiting examples, and which makes reference to the attached drawings in which:

FIG. 3 depicts a view from above of a second embodiment of the seat of the invention, the backrest being folded onto the seat cushion and the turntable being pivoted to one side of the backrest;

FIG. 4 depicts a perspective view of part of the backrest according to an alternative form of the second embodiment of the invention;

FIG. 5 depicts the backrest part depicted in FIG. 4, part of the turntable being lifted up to open up a housing; and FIG. 6 depicts the backrest part depicted in FIG. 4, with the turntable pivoted to open access to a housing.

DETAILED DESCRIPTION OF THE INVENTION

Figure 1:
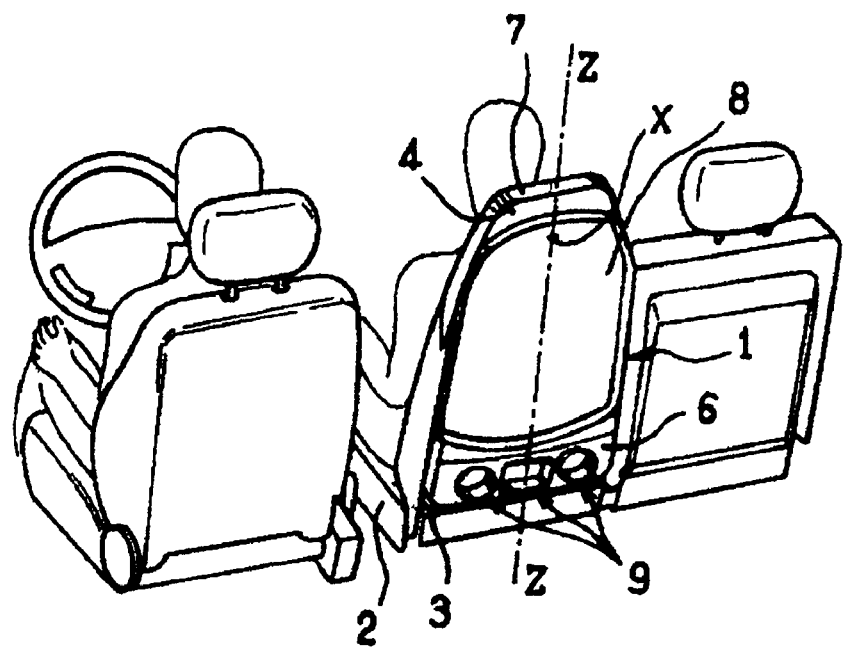
FIG. 1 depicts a perspective view from the rear of a first embodiment of the seat of the invention, when this seat is in the unfolded position.

With reference to FIG. 1 which describes a first embodiment of the invention, the seat of the invention comprises a backrest 1 and a seat cushion 2 which is fixed to the floor of a motor vehicle and which is substantially perpendicular to the backrest 1, when the latter is in its unfolded position, as depicted in FIG. 1. The backrest 1 is connected to the seat cushion 2 at a first edge 3. The backrest 1 also comprises a headrest-forming portion 4 which extends the backrest 1 vertically when this backrest is in its unfolded position. The rear face of the backrest 1, which is the only face visible in FIG. 1, corresponds to that face of the backrest that does not come into contact with the back of a user sitting on the seat cushion 2. This rear face is the opposite face to the front face of the backrest 1 which does come into contact with the back of the user sitting on the seat cushion 2. This rear face comprises a substantially flat tablet-forming element 6 which completely covers it and forms a substantially planar and continuous rigid surface extending from the first edge 3 of the backrest 1, which constitutes the junction between the seat cushion 2 and the backrest 1, and the free edge 7 of the headrest-forming portion 4. Because the backrest 1 comprises a headrest-forming portion 4 it is therefore longer than a standard backrest, the tablet-forming element 6 completely covering the rear face of the backrest 1 (including the headrest-forming portion), and so the tablet-forming area is therefore considerably enlarged by comparison with the seat that has no headrest built into the backrest of the seat. Furthermore, this large surface area allows the use of an extensive turntable.

Figure 2:
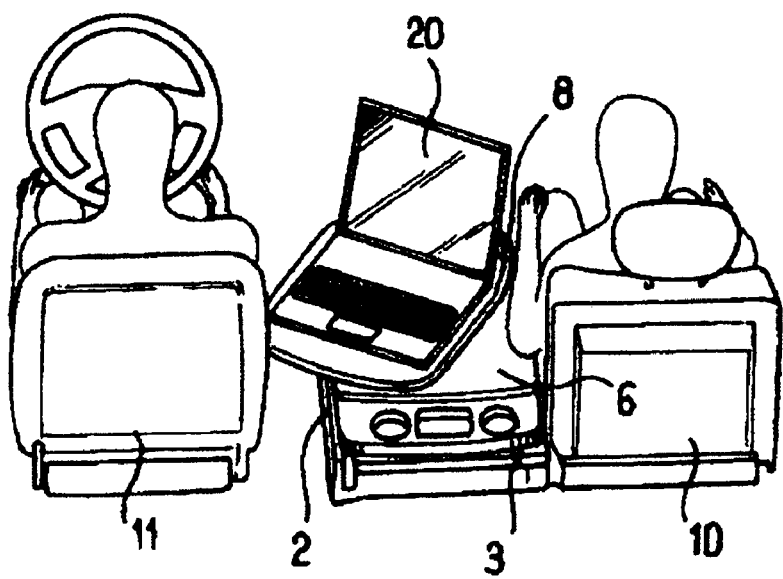
FIG. 2 depicts a perspective view of the first embodiment of the invention, the backrest being folded onto the seat cushion and the turntable being pivoted to one side of the backrest.

As depicted in FIGS. 1 and 2, a turntable 8 is attached to the tablet-forming element 6 of the backrest 1. This turntable 8 is articulated such that it rotates about an axis X perpendicular to the plane of the rear face (i.e. to the tablet-forming element 6). In the first embodiment depicted here, the axis of rotation X of the turntable 8 is positioned near the free edge 7 of the headrest-forming portion 4. The portion of the tablet-forming element 6 that is situated near the first edge 3 of the backrest 1 comprises cavities 9 used, for example, as a support for a can of drink or a cup.

With reference to FIG. 2, when the backrest 1 is folded onto the seat cushion 2, the rear face of the backrest 1 which is covered with the tablet-forming element 6 becomes a tablet or work surface positioned between the two seats 10 and 11 located on each side of the seat according to the invention and facing in the same direction thereas. The turntable 8 can be pivoted either toward the driver, as it is in FIG. 2, or toward the passenger, by rotating about the axis X. The position of the axis X of rotation, which in the present embodiment is positioned along the longitudinal axis Z of the backrest 1, makes it possible to obtain symmetric excursion on each side of the backrest 1, providing the same additional working area on each side. The size of the turntable 8 and that of the rear face 6 of the backrest 1 make it possible, by rotating the turntable 8, to cause a portion of the latter to protrude beyond the rear face and laterally thereto, thus creating an additional work surface situated in close proximity to a user sitting in a seat adjacent to the seat of the invention, and ideally oriented.

According to another embodiment that has not been depicted, the axis of rotation X is positioned off the longitudinal axis Z of the backrest, thus creating asymmetric excursion of the table, making it possible to improve the working ergonomics of a user sitting on the side of greatest excursion, at the expense of a user sitting on the opposite side.

The elements of the second embodiment, which is depicted in FIGS. 3 to 6, which are common to the elements of the aforementioned first embodiment, bear the same references.

In the second embodiment depicted in FIG. 3, the axis of rotation X of the turntable 8 is positioned on the longitudinal axis Z of the backrest 1, but toward the first edge 3 of the backrest 1, that is to say on the opposite side to the position of the axis of rotation X in the first embodiment. This position also allows the turntable 8 a large excursion. In FIG. 3, the turn-table 8 is pivoted toward the passenger sitting beside the seat of the invention, which is folded. As in the first embodiment, the pivoting of the turntable about the axis X creates an additional tablet portion close to the passenger and which therefore can be easily used.

Thus, as depicted in FIGS. 2 and 3, the two embodiments of the invention facilitate the use, for example, of a laptop computer 20 placed on the turntable 8, by bringing it closer to the users sitting on the adjacent seats 10 and 11, and also by allowing it to be oriented, by pivoting the turntable 8 about the axis X.

FIG. 4 depicts in greater detail an alternative form of embodiment of part of the backrest corresponding to the second embodiment of the invention. The tablet-forming element 6 comprises a carcass 13 which covers the frame of the backrest 1 (not depicted) and therefore forms the rear face thereof. The carcass 13 is a rigid shell which forms a storage cavity or housing 14, visible in FIGS. 5 and 6, which is set into the thickness of the padding of the backrest 1. The open face of the storage housing 14 is covered by the turntable 8, when the latter is positioned along the longitudinal axis Z of the backrest 1, as depicted in FIG. 4. Opposite the axis of rotation X of the turntable 8 there is a portion 15 which is fixed and which comprises storage cavities 9. Near the axis of rotation X of the turntable 8 there is a hinge 17 parallel to the first edge 3 of the backrest 1 and to the free edge 7 of the headrest-forming portion 4. As depicted in FIG. 5, it is therefore possible to lift up part of the turntable 8 (the part which does not comprise the first axis of rotation) by pivoting it about the hinge 17. The turntable 8 thus acts as a lid to the storage housing 14.

As depicted in FIG. 6, it is also possible to uncover the storage housing 14 by pivoting the turntable 8 about its axis of rotation X.

It is also possible, without departing from the scope of the present invention, to provide a storage housing 14 which is only accessible simply by pivoting the turntable 8. In this case, there is no need to equip the table with a hinge.

The carcass 13 described with reference to FIGS. 4 to 6 may be adapted to the first embodiment, the fixed tablet portion is then located close to the first edge 3 of the backrest 1.

The invention claimed is:

1. A motor vehicle seat comprising:
    a seat cushion; and
    a backrest that can be folded onto the seat cushion, which includes a rear face having a tablet-forming element, the rear face being brought into a substantially horizontal position when the backrest is folded onto the seat cushion,
    wherein the tablet-forming element includes a turntable pivot-mounted on the rear face of the backrest about a single axis, substantially perpendicular to the rear face, the turntable defining an outermost surface of at least a portion of the backrest and configured to be pivoted about the single axis, the pivoting constituting the only degree of freedom of the turntable with respect to the backrest, into a position in which a portion of the turntable protrudes laterally outward from an edge of the rear face of the backrest, and
    the backrest includes a headrest-forming portion defining an uppermost portion of the vehicle seat when in an upright position, the single axis of rotation of the turntable being positioned in a region of the headrest-forming portion.

2. The seat as claimed in claim 1, wherein the tablet-forming element comprises a storage housing accessible from the rear face of the backrest and located at least partially under the turntable.

3. The seat as claimed in claim 2, wherein the housing is positioned to be accessible by rotating the turntable about the single axis of rotation.

4. The seat as claimed in claim 1, wherein the backrest comprises a frame, and the tablet-forming element comprises a rigid carcass fixed to the frame of the backrest and that supports the turntable.

5. The seat as claimed in claim 1, wherein the backrest includes a headrest portion and the tablet-forming element substantially covers the rear face of the backrest including the headrest portion.

6. The seat as claimed in claim 1, wherein the single axis of rotation of the turntable is positioned in the region of the headrest-forming portion such that the single axis of rotation maintains a same position along a longitudinal axis of the backrest when the backrest is unfolded and when the backrest is folded onto the seat cushion and the turntable is rotating.

7. A motor vehicle, comprising:
a row of at least two seats, wherein at least one of the seats includes:
a seat cushion; and
a backrest that can be folded onto the seat cushion, which includes a rear face having a tablet-forming element, the rear face being brought into a substantially horizontal position when the backrest is folded onto the seat cushion,
wherein the tablet-forming element includes a turntable pivot-mounted on the rear face of the backrest about a single axis, substantially perpendicular to the rear face, the turntable defining an outermost surface of at least a portion of the backrest and configured to be pivoted about the single axis, the pivoting constituting the only degree of freedom of the turntable with respect to the backrest, into a position in which a portion of the turntable protrudes laterally outward from an edge of the rear face of the backrest, and
the backrest includes a headrest-forming portion defining an uppermost portion of the vehicle seat when in an upright position, the single axis of rotation of the turntable being positioned in a region of the headrest-forming portion.

8. The vehicle as claimed in claim 7, wherein the row comprises at least three seats and the at least one of the seats is positioned between two of the at least three seats.

9. The motor vehicle as claimed in claim 7, wherein the row of seats is a row of front seats or a row of rear seats.

10. The vehicle as claimed in claim 7, wherein the tablet-forming element comprises a storage housing accessible from the rear face of the backrest and located at least partially under the turntable.

11. The vehicle as claimed in claim 7, wherein the housing is positioned to be accessible by rotating the turntable about the single axis of rotation.

12. The vehicle as claimed in claim 7, wherein the backrest comprises a frame, and the tablet-forming element comprises a rigid carcass fixed to the frame of the backrest and that supports the turntable.

13. The vehicle as claimed in claim 7, wherein the backrest includes a headrest portion and the tablet-forming element substantially covers the rear face of the backrest including the headrest portion.

14. The vehicle as claimed in claim 7, wherein the single axis of rotation of the turntable is positioned in the region of the headrest-forming portion such that the single axis of rotation maintains a same position along a longitudinal axis of the backrest when the backrest is unfolded and when the backrest is folded onto the seat cushion and the turntable is rotating.

15. A motor vehicle seat comprising:
a seat cushion; and
a backrest that can be folded onto the seat cushion, which includes a rear face having a tablet-forming element, the rear face being brought into a substantially horizontal position when the backrest is folded onto the seat cushion,
wherein the tablet-forming element includes a turntable pivot-mounted on the rear face of the backrest about a first axis, substantially perpendicular to the rear face, the turntable defining an outermost surface of at least a portion of the backrest and configured to be brought into a position in which a portion of the turntable protrudes laterally outward from an edge of the rear face of the backrest, and
the backrest includes a first edge connected to the seat cushion and a longitudinal axis, and the first axis of rotation of the turntable intersects the longitudinal axis nearer to the first edge of the backrest than to an edge located opposite to the first edge.

* * * * *